US012563320B2

(12) United States Patent　(10) Patent No.:　US 12,563,320 B2
Nakajima　(45) Date of Patent:　Feb. 24, 2026

(54) TIME-TO-DIGITAL CONVERSION DEVICE, RANGING DEVICE, AND MOVABLE BODY

(71) Applicant: CANON KABUSHIKI KAISHA, Tokyo (JP)

(72) Inventor: Yuji Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 18/362,089

(22) Filed: Jul. 31, 2023

(65) Prior Publication Data

US 2024/0048872 A1　Feb. 8, 2024

(30) Foreign Application Priority Data

Aug. 5, 2022　(JP) ................................. 2022-125675

(51) Int. Cl.
H04N 25/773　(2023.01)
G04F 10/00　(2006.01)

(52) U.S. Cl.
CPC ......... H04N 25/773 (2023.01); G04F 10/005 (2013.01)

(58) Field of Classification Search
CPC ............................ H04N 25/773; G04F 10/005
USPC ................................................... 348/207.99
See application file for complete search history.

(56) References Cited

U.S. PATENT DOCUMENTS 7,342,560 B2　3/2008　Yuki
8,773,182 B1　7/2014　Degani 8,878,613 B2　11/2014　Wang
2014/0055181 A1　2/2014　Chaivipas et al.
2014/0226166 A1　8/2014　Kumar et al.
2014/0232827 A1　8/2014　Kumar et al.

FOREIGN PATENT DOCUMENTS

JP　2007228043　*　9/2007
JP　2015-154444 A　8/2015
JP　2016-211881 A　12/2016
JP　2022-124396 A　8/2022
KR　10-2011-0113790 A　10/2011

(Continued)

OTHER PUBLICATIONS

TDC7200 Time-to-Digital Converter for Time-of-Flight Applications in LIDAR, Magnetostrictive and Flow Meters, SNAS647D, Mar. 31, 2016, texas Instruments Incorporated.

(Continued)

*Primary Examiner* — Joel W Fosselman
(74) *Attorney, Agent, or Firm* — VENABLE LLP

(57)　ABSTRACT

A time-to-digital conversion device according to an embodiment of the present disclosure is a time-to-digital conversion device configured to output time digital data according to a time from a first timing to a second timing, including a first circuit that includes an upper counter configured to start counting a clock signal according to the first timing, and generates upper bits of the time digital data; a second circuit that includes a delay element configured to start operation according to the second timing and a lower counter configured to count an oscillation cycle of the delay element, and generates lower bits of the time digital data; and a control circuit that controls a phase of an output signal of the delay element based on the clock signal.

19 Claims, 18 Drawing Sheets

(56)      References Cited

FOREIGN PATENT DOCUMENTS

| | | | |
|---|---|---|---|
| KR | 10-2021-0004551 | A | 1/2021 |
| WO | 2012/153375 | A1 | 11/2012 |
| WO | 2013/034770 | A2 | 3/2013 |
| WO | 2022/172622 | A1 | 8/2022 |

OTHER PUBLICATIONS

India Office Action issued Dec. 26, 2025 during prosecution of corresponding Indian patent application No. 202344052216.
Korean Notice of Allowance issued Jan. 15, 2026 during prosecution of corresponding Korean Application No. 10-2023-0093513. (English language translation included).

* cited by examiner

TDCLK

LOWER TDC

4×TDCLK

TIME-TO-DIGITAL CONVERSION DEVICE, RANGING DEVICE, AND MOVABLE BODY

BACKGROUND OF THE INVENTION

Field of the Invention

The present disclosure relates to a time-to-digital conversion device, a ranging device, and a movable body.

Description of the Related Art

In recent years, time-to-digital converters (TDCs) that convert time into digital signals have been utilized in various fields. The time-to-digital conversion device described in International Publication No. WO2013/034770 is applied to a sensor capable of capturing a three-dimensional (3D) range image, which measures the flight time of photons detected by SPAD (Single Photon Avalanche Diode) pixels. Further, the time-to-digital conversion device in International Publication No. WO2013/034770 includes an upper (coarse) TDC and a lower (fine) TDC.

SUMMARY OF THE INVENTION

In the time-to-digital conversion device described in International Publication No. WO2013/034770, a deterioration in conversion accuracy may be caused by a code error at the boundary between the upper TDC data and the lower TDC data.

According to an embodiment of the present disclosure, there is provided a time-to-digital conversion device configured to output time digital data according to a time from a first timing to a second timing, including a first circuit that includes an upper counter configured to start counting a clock signal according to the first timing, and generates upper bits of the time digital data; a second circuit that includes a delay element configured to start operation according to the second timing and a lower counter configured to count an oscillation cycle of the delay element, and generates lower bits of the time digital data; and a control circuit that controls a phase of an output signal of the delay element based on the clock signal.

Further features of the present invention will become apparent from the following description of exemplary embodiments with reference to the attached drawings.

BRIEF DESCRIPTION OF THE DRAWINGS

FIG. 13 is a circuit diagram of a time-to-digital conversion device according to the third embodiment.

FIG. 15 is a block diagram of an optical time-of-flight ranging image sensor according to a fifth embodiment.

DESCRIPTION OF THE EMBODIMENTS

Figure 1:
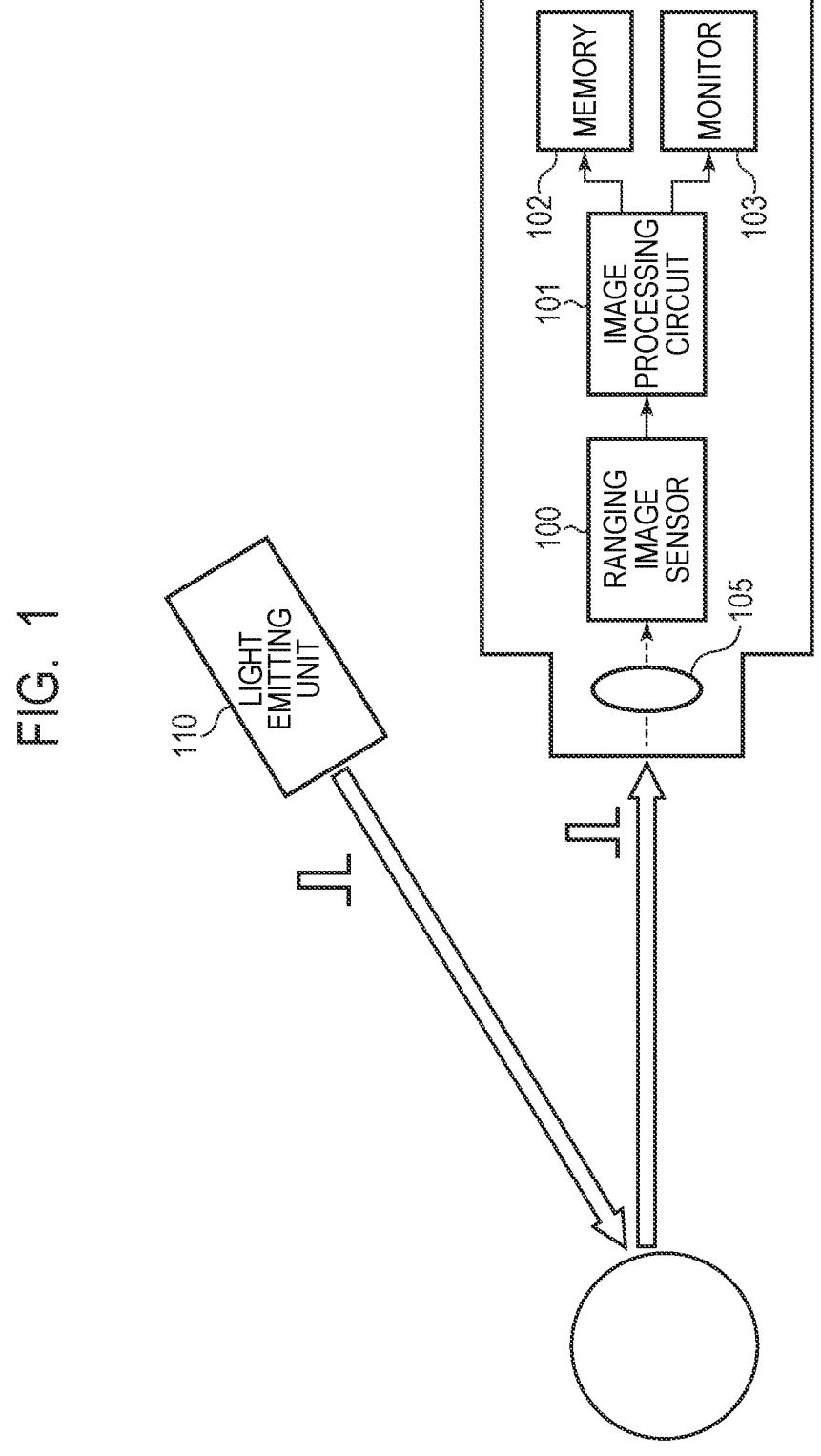
FIG. 1 is a schematic diagram of a ranging image sensor system according to a first embodiment.

Embodiments of the present disclosure will be described below with reference to the accompanying drawings. The following embodiments are intended to embody the technical idea of the present invention and do not limit the present invention. The sizes and positional relationships of the members shown in the drawings may be exaggerated for clarity of explanation. In the following description, the same components are denoted by the same reference numerals, and description thereof may be omitted.

First Embodiment

FIG. 1 is a schematic diagram of a ranging image sensor system according to the present embodiment. The ranging image sensor system is a ranging device that measures a distance to an object based on a time of flight (TOF) of light, and includes a light emitting unit 110, an optical system 105, a ranging image sensor 100, an image processing circuit 101, a memory 102, and a monitor 103.

The light emitting unit 110 can emit pulse light such as laser light toward the object. The optical system 105 includes one or a plurality of lenses, and forms an image of image light (incident light) reflected by the object on a light receiving surface (light receiving portion) of the ranging image sensor 100. The ranging image sensor 100 includes a SPAD (Single Photon Avalanche Diode) that receives a single photon and a time-to-digital conversion device that converts a time from light emission to light reception into a digital signal. The image processing circuit 101 generates a range image corresponding to the distance to the object based on the signal output from the time-to-digital conversion device and the known speed of the light. The generated range image is output to the memory 102 and the monitor 103. The memory 102 stores the range images, and the monitor 103 is capable of displaying the range images.

Figure 2:
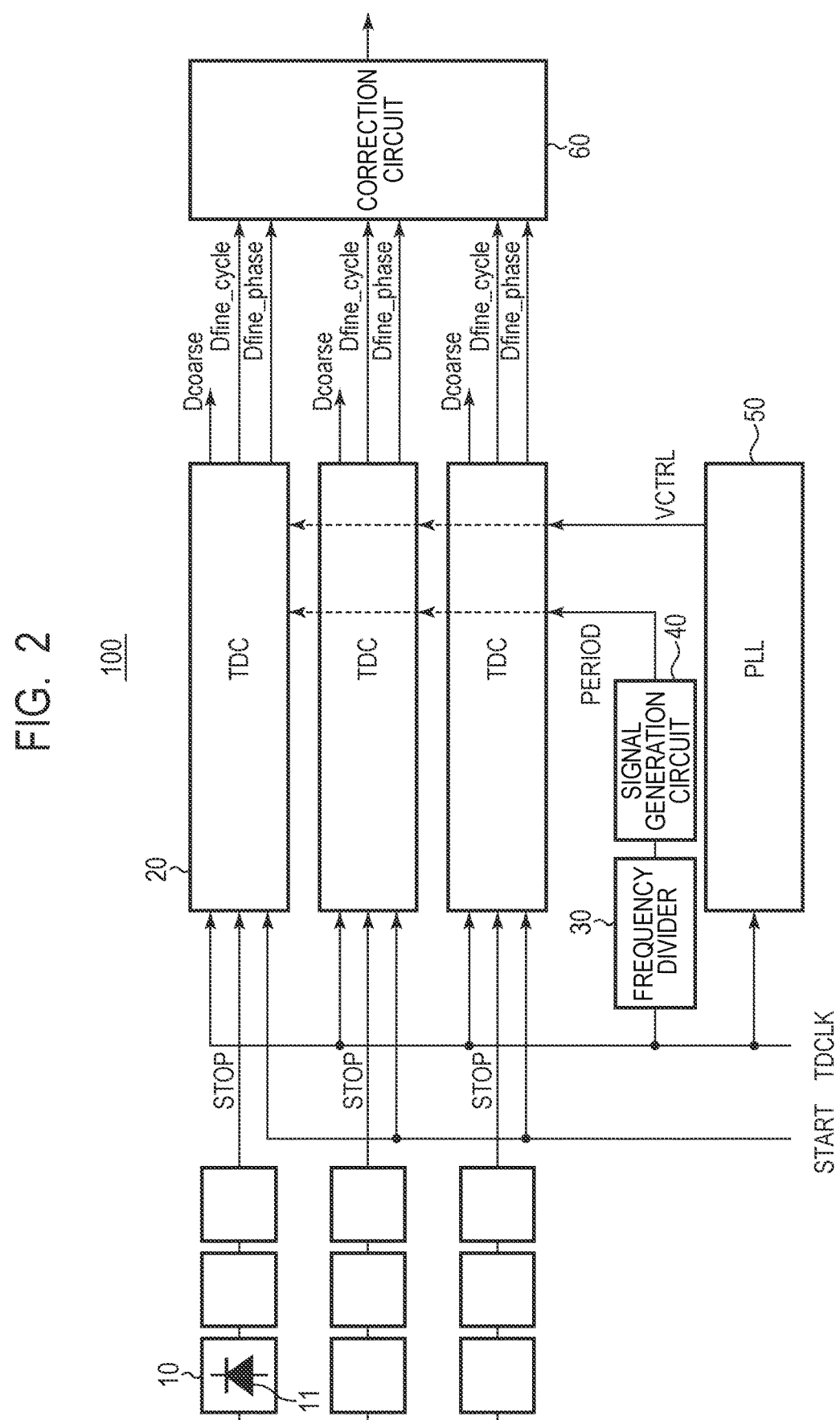
FIG. 2 is a block diagram of the ranging image sensor according to the first embodiment.

FIG. 2 is a block diagram of the ranging image sensor 100 according to the present embodiment. The ranging image sensor 100 includes a plurality of pixels 10 arranged in a plurality of rows and a plurality of columns, and a time-to-digital conversion device that converts a time from light emission to light reception, into a digital signal based on signals from the plurality of pixels 10. The digital conversion device further includes a TDC 20, a frequency divider 30, a signal generation circuit 40, a PLL (Phase Locked Loop) circuit 50, and a correction circuit 60. Hereinafter, the configuration of each unit of the ranging image sensor 100 will be described in detail with reference to FIGS. 2 to 8.

Figure 3:
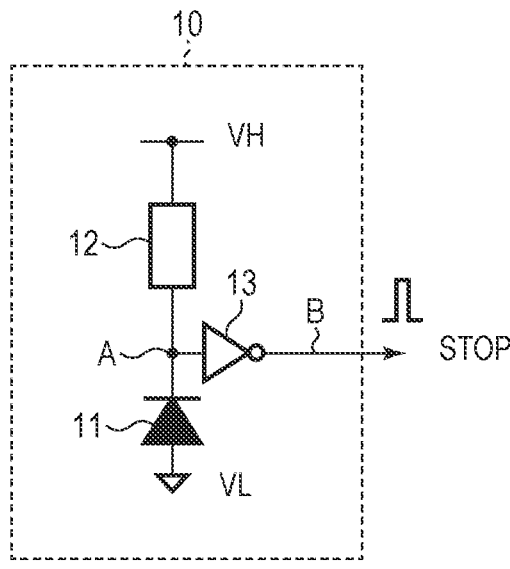
FIG. 3 is a circuit diagram of a pixel according to the first embodiment.

FIG. 3 is a circuit diagram of the pixel 10 in the present embodiment. The pixel 10 includes a SPAD 11, a quenching element 12, and a waveform shaping unit 13, and functions as a light receiving unit of pulse light. The SPAD 11 generates charge pairs corresponding to the incident light by photoelectric conversion. A voltage VL (first voltage) is supplied to the anode of the SPAD 11, and a voltage VH (second voltage) higher than the voltage VL supplied to the anode is supplied to the cathode of the SPAD 11. A reverse bias voltage is applied to the anode and the cathode, so that the SPAD 11 can be in a state of avalanche multiplication. When a photon enters the SPAD 11 in a state where the reverse bias voltage is supplied, charges generated by the photon cause avalanche multiplication, and an avalanche current is generated.

The quenching element 12 is provided between the power supply line for supplying the voltage VH and the cathode of the SPAD 11. The quenching element 12 functions as a load circuit (quenching circuit) at the time of signal multiplication by avalanche multiplication, and has a function of suppressing a voltage supplied to the SPAD 11 and suppressing avalanche multiplication (quenching operation). Further, the quenching element 12 has a function of returning the voltage supplied to the SPAD 11 to the voltage VH by flowing a current corresponding to the voltage drop in the quenching operation (recharging operation).

The waveform shaping unit 13 functions as a signal generation unit that generates a detection pulse based on an output generated by incidence of a photon. That is, the waveform shaping unit 13 shapes the potential change of the cathode of the SPAD 11 obtained at the time of photon detection, and outputs a signal STOP of a rectangular-wave (detection pulse). The waveform shaping unit 13 may be configured by, for example, an inverter circuit. Although FIG. 3 shows one inverter circuit, a circuit in which a plurality of inverter circuits are connected in series may be used. Moreover, another circuit having a function of shaping waveform may be used.

Figure 4:
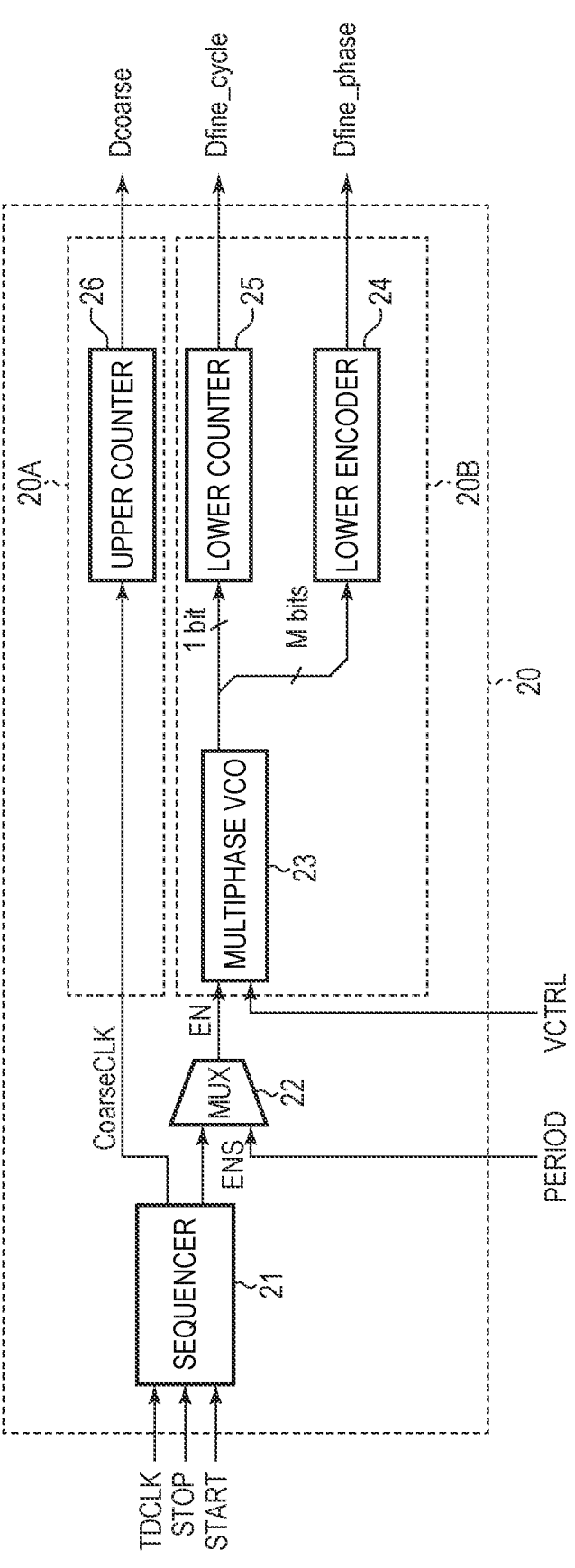
FIG. 4 is a circuit diagram of a time-to-digital conversion device according to the first embodiment.

FIG. 4 is a circuit diagram of the TDC 20 according to the present embodiment. The TDC 20 is provided for each row of the pixels 10, and the pixels 10 in each column can be sequentially connected to the TDC 20 by a scan circuit (not shown). The TDC 20 includes a sequencer 21, a multiplexer 22, a multiphase VCO (Voltage Controlled Oscillator) 23, a lower encoder 24, a lower counter 25, and an upper counter 26. In the following description, the upper counter 26 may be referred to as an upper TDC 20A (first circuit), and the multiphase VCO 23, the lower encoder 24, and the lower counter 25 may be referred to as a lower TDC 20B (second circuit).

The signal START, the signal STOP, and the clock signal TDCLK are input to the sequencer 21. The signal START is a signal synchronized with the light emission timing (first timing) of the light emitting unit 110 in FIG. 1. The TDC 20 starts time measurement in response to the signal START. The signal STOP is a signal output from the pixel 10. That is, the signal STOP indicates the timing (second timing) at which the pixel 10 receives the pulse light that is emitted from the light emitting unit 110 and reflected by the object. The TDC 20 can convert the time from the signal START to the signal STOP into a digital signal. The clock signal TDCLK is a reference clock common to the plurality of TDCs 20. The clock signal TDCLK is a so-called global clock used not only in the TDC 20 but also in the entire ranging image sensor system of FIG. 1. The sequencer 21 generates a sequence signal ENS for controlling the clock signal CoarseCLK of the upper counter 26 and the multiphase VCO 23 based on the inputted signal START, signal STOP, and clock signal TDCLK.

The multiplexer 22 is a switching circuit that selects either the sequence signal ENS or the signal PERIOD from the signal generation circuit 40 according to the operation mode, and outputs the selected signal to the multiphase VCO 23 as an enable signal EN. The time-to-digital conversion device according to the present embodiment has a range image measurement mode for measuring a range image of an object, and a period measurement mode for measuring a period of the lower encoder 24, the lower counter 25, and the upper counter 26. In the range image measurement mode (first operation mode), the multiplexer 22 outputs the sequence signal ENS as the enable signal EN, and operates the multiphase VCO (delay element) 23 until a predetermined period has elapsed from the light reception timing (second timing). Further, the multiplexer 22 outputs the signal PERIOD for correction processing as the enable signal EN in the period measurement mode (second operation mode), and operates the multiphase VCO (delay element) 23 during N cycles (N is a positive integer) of the clock signal TDCLK.

The multiphase VCO 23 functions as a delay element and may be a multiphase output voltage-controlled oscillator such as a ring oscillator circuit. When the ring oscillator circuit is composed of M (M is an integer greater than or equal to 2) inverting circuits, the multiphase VCO 23 can output M-bits signals. The details of the multiphase VCO 23 will be described later.

The lower encoder 24 encodes the M-bits signal of the multiphase VCO 23 and outputs binary code data Dfine_phase. The lower counter 25 counts a clock signal of one phase (one bit) among the M-bits signals of the multiphase VCO 23, and outputs binary code data Dfine_cycle. That is, the data Dfine_cycle represents the oscillation cycle of the multiphase VCO 23. The upper counter 26 starts counting the clock signal CoarseCLK (clock signal TDCLK) at the timing of rising of the signal START, and stops counting after a predetermined period has elapsed from rising of the signal STOP. The upper counter 26 outputs the count result as binary code data Dcoarse. In the following description, the data Dcoarse of the upper counter 26 may be referred to as upper TDC data (upper bits), and the data Dfine_cycle of the lower counter 25 and the data Dfine_phase of the lower encoder 24 may be referred to as lower TDC data (lower bits).

Figure 5:
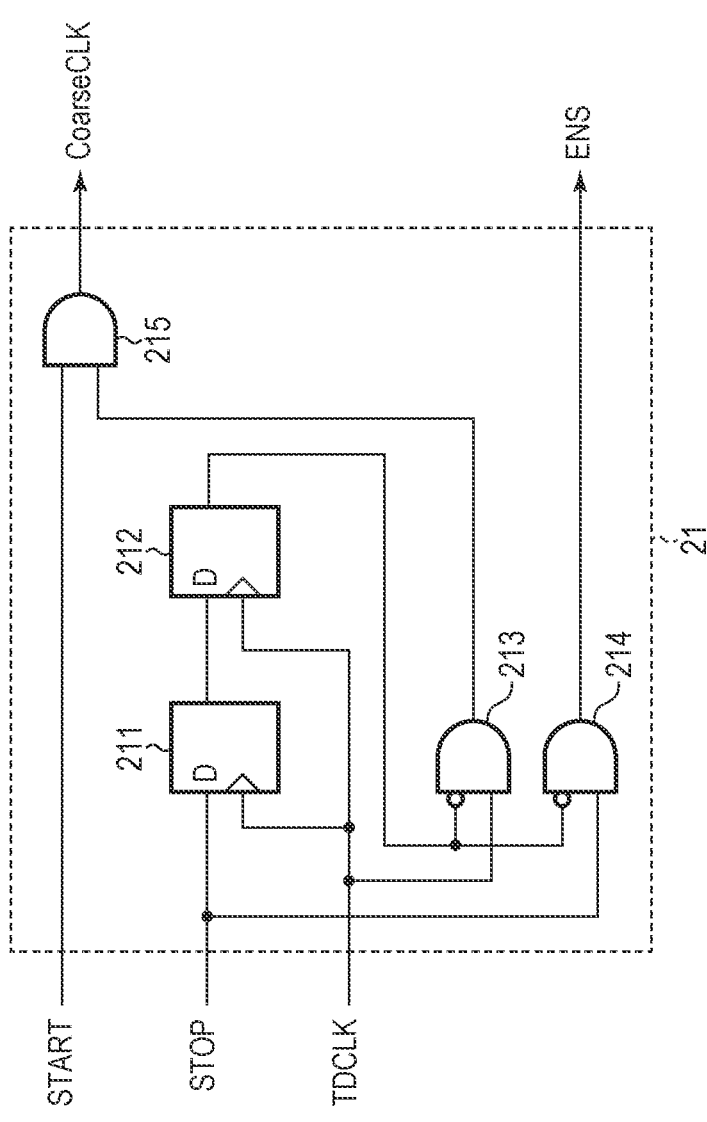
FIG. 5 is a circuit diagram of the time-to-digital conversion device according to the first embodiment.

FIG. 5 is a circuit diagram showing details of the sequencer 21. The sequencer 21 includes flip-flops 211 and 212 and gates 213, 214 and 215, and controls the operation of the TDC 20. Although not shown, a circuit for latching the signal START and the signal STOP is provided in the preceding stage of the sequencer 21. The flip-flops 211 and 212 are D-type and are cascade-connected. That is, the signal STOP is input to the input node D of the flip-flop 211, and the output node of the flip-flop 211 is connected to the input node D of the flip-flop 212. The clock signal TDCLK is input to the clock nodes of the flip-flops 211 and 212. An output node of the flip-flop 212 is connected to an inverting input node of each of the gates 213 and 214. The clock signal TDCLK is input to a non-inverting input node of the gate 213, and the signal STOP is input to a non-inverting input node of the gate 214. The sequence signal ENS maintains the high level from the rising timing of the signal STOP to the second rising timing of the clock signal TDCLK. The sequence signal ENS is output from the multiplexer 22 to the multiphase VCO 23 as an enable signal EN. The signal START is input to one input node of the gate 215, and the other input node is connected to the output node of the gate 213. Accordingly, the clock signal TDCLK is output from the output node of the gate 215 from the timing of the rising of the signal START to the second rising timing of the clock signal TDCLK after the rising of the signal STOP. The clock signal TDCLK at the output node of the gate 215 is output to the upper counter 26 as the clock signal CoarseCLK.

Figure 6:
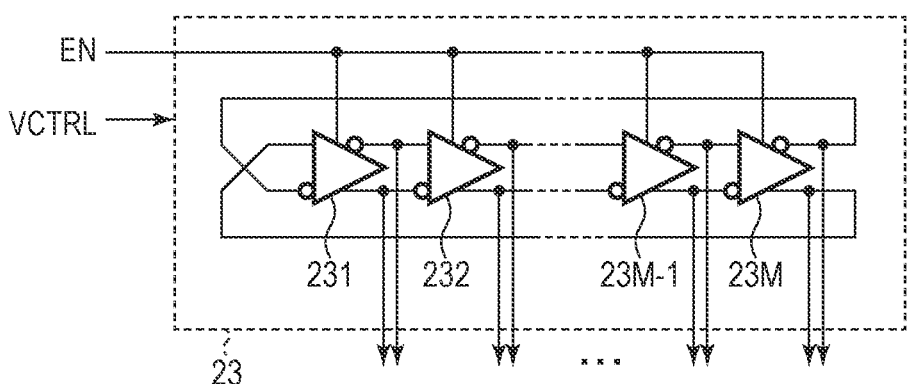
FIG. 6 is a circuit diagram of the time-to-digital conversion device according to the first embodiment.

FIG. 6 is a circuit diagram illustrating details of the multiphase VCO 23. As described above, the multiphase VCO 23 includes a ring oscillator circuit including M inverting circuits 231 to 23M. The non-inverting output node of the inverting circuit 231 is connected to the inverting input node of the inverting circuit 232, and the inverting output node of the inverting circuit 231 is connected to the non-inverting input node of the inverting circuit 232. Similarly, the inverting circuits 232 to 23M are connected in cascade, and the output node of the inverting circuit 23M is connected to the input node of the inverting circuit 231. The enable signal EN is input to the inverting circuits 231 to 23M. When the enable signal EN becomes high level, the output signals of the output nodes of the inverting circuits 231 to 23M are sequentially and repeatedly inverted with a predetermined delay time. Thereby, the multiphase VCO 23 operates as an M-bits multiphase oscillator. When the enable signal EN becomes low level, the inverting operation of the inverting circuits 231 to 23M is stopped, and the M-bits output signal is reset to the initial value (the initial phase). A control voltage VCTRL is applied to the multiphase VCO 23, and the oscillation frequencies and phases of the inverting circuits 231 to 23M can be controlled by the control voltage VCTRL. For example, the control voltage VCTRL may be applied to the gate node of the current source transistor or the load transistor constituting the inverting circuits 231 to 23M. Thereby, the delay time (phase) of each of the inverting circuits 231 to 23M changes according to the control voltage VCTRL, and the oscillation frequency and phase of the ring oscillator circuit can be controlled.

Figure 7:
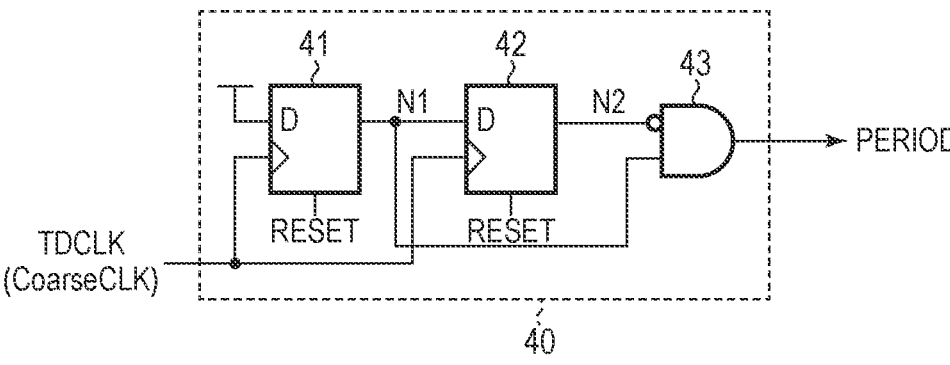
FIG. 7 is a circuit diagram of the time-to-digital conversion device according to the first embodiment.

The frequency divider 30 and the signal generation circuit 40 generate a signal PERIOD for the period measurement mode. FIG. 7 is a circuit diagram of the signal generation circuit 40. The signal generation circuit 40 includes flip-flops 41 and 42 and a gate 43. The flip-flops 41 and 42 are D-type and are cascade-connected. The input node D of the flip-flop 41 is set to a high level (power supply voltage), and the node N1 of the flip-flop 41 is connected to the input node D of the flip-flop 42. The clock signal TDCLK is input to the clock nodes of the flip-flops 41 and 42. The non-inverting input node of the gate 43 is connected to the node N1, and the inverting input node of the gate 43 is connected to the node N2. After the signal RESET at the reset nodes of the flip-flops 41 and 42 becomes low level, the node N1 becomes high level at the rising timing of the clock signal TDCLK. At the rising timing of the clock signal TDCLK after one cycle, the node N2 becomes high level. Therefore, the output node of the gate 43 outputs the signal PERIOD that is at high level during one cycle of the clock signal TDCLK. Further, the frequency divider 30 in the preceding stage of the signal generation circuit 40 may divide the frequency of the clock signal TDCLK, and it is possible to generate the signal PERIOD that is at high level every two cycles or every four cycles of the clock signal TDCLK.

Figure 8:
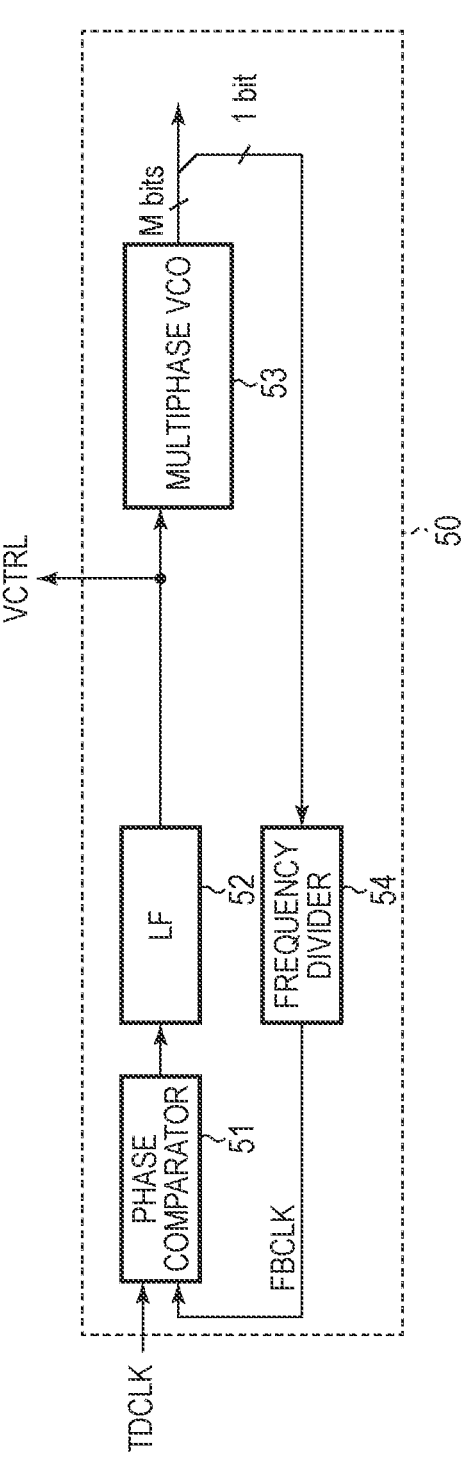
FIG. 8 is a circuit diagram of the time-to-digital conversion device according to the first embodiment.

FIG. 8 is a circuit diagram of the PLL circuit (control circuit) 50 according to the present embodiment. The PLL circuit 50 is a phase synchronization circuit, and includes a phase comparator 51, a loop filter (LF) 52, a multiphase VCO 53, and a frequency divider 54. The phase comparator 51, the loop filter 52, and the frequency divider 54 constitute a feedback circuit that feeds back the control voltage (control signal) VCTRL to the multiphase VCO 53.

The multiphase VCO 53 is preferably composed of a ring oscillator circuit to have the same characteristics as the multiphase VCO 23. For example, the multiphase VCO 53 may be configured as a replica circuit having the same circuit configuration and size as the multiphase VCO 23 on a semiconductor substrate. The frequency divider 54 divides the frequency of the clock signal of one bit among the M bits of the multiphase VCO 53 to 1/N (N is an integer greater than or equal to 2) and outputs a feedback clock signal FBCLK. That is, the feedback clock signal FBCLK is a frequency-divided signal of the oscillation cycle of the multiphase VCO 53. The phase comparator 51 includes a phase comparison circuit and a charge pump circuit, and outputs a charge pump voltage obtained by integrating the phase difference between the clock signal TDCLK and the feedback clock signal FBCLK. The loop filter 52 smooths the charge pump voltage and outputs the control voltage VCTRL. The control voltage VCTRL is input to the multiphase VCO 53, and the phase of the multiphase VCO 53 is controlled by the control voltage VCTRL. Thereby, the clock signal TDCLK and the feedback clock signal FBCLK obtained by dividing the output signal of the multiphase VCO 53 have the same phase. The control voltage VCTRL is similarly supplied to the multiphase VCO 23 of each TDC 20. The multiphase VCO 23 of the TDC 20 oscillates at a frequency N times the frequency of the clock signal TDCLK (N is an integer greater than or equal to 2) and the phase of each multiphase VCO 23 is synchronized. As described above, since the frequency and phase of the multiphase VCO 23 of the plurality of TDCs 20 are controlled by the common PLL circuit 50, they are robust with respect to the manufacturing process, voltage, and temperature. Therefore, even if the element size of the multiphase VCOs 23 and 53 is reduced, it is possible to suppress the characteristic variation in the plurality of TDCs 20 and realize high-precision time-to-digital conversion while reducing power consumption.

Figure 9:
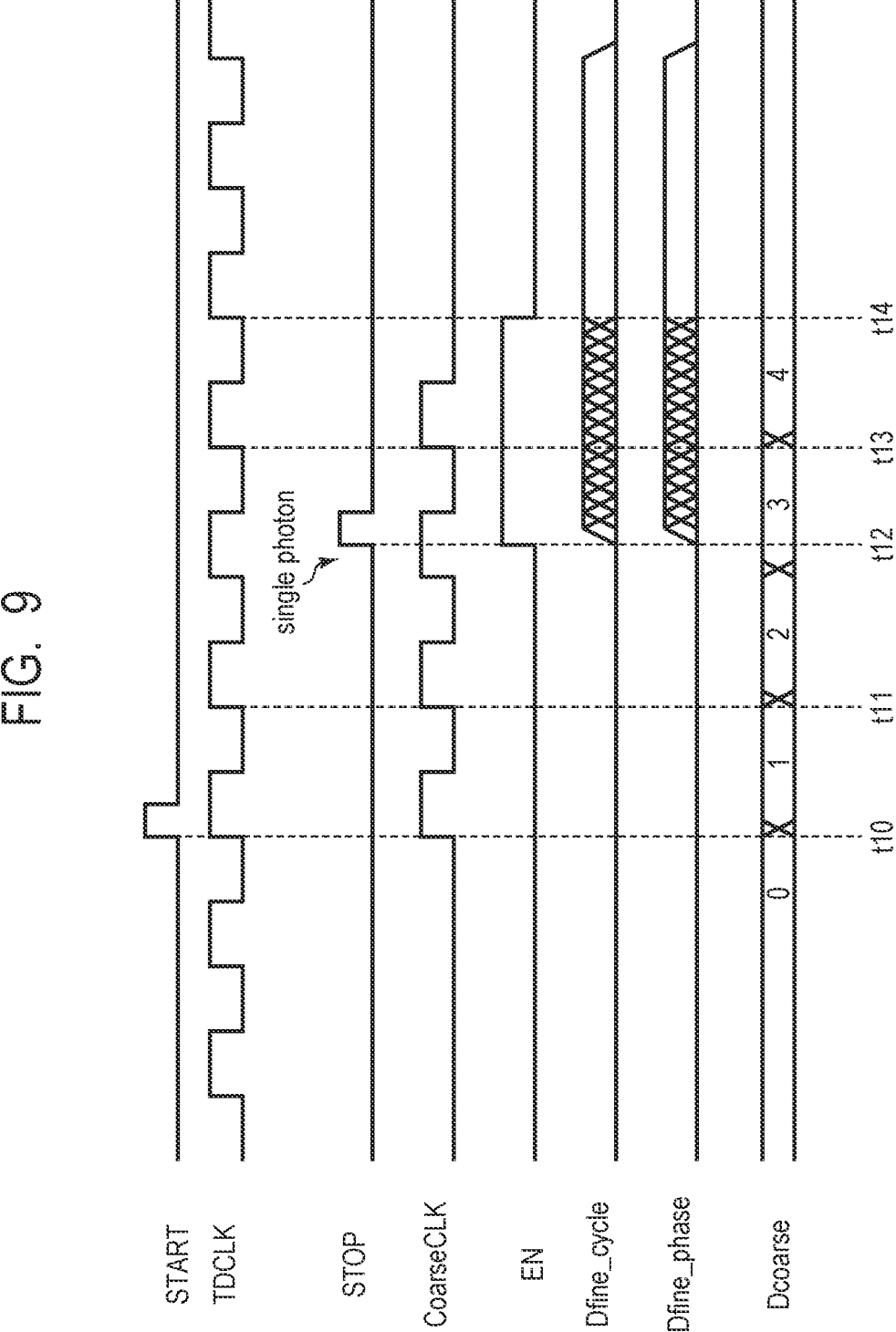
FIG. 9 is a timing chart of the ranging image sensor according to the first embodiment.

Next, the operation of the ranging image sensor according to the present embodiment will be described. FIG. 9 is a timing chart showing the operation of the ranging image sensor in the range image measurement mode. Note that although an operation delay may occur in an actual circuit, the timing chart of FIG. 10 does not include delay time in the operation of the circuit. In the range image measurement mode, the multiplexer 22 outputs the sequence signal ENS from the sequencer 21 to the multiphase VCO 23 as the enable signal EN.

At time t10, the signal START transitions from the low level to the high level in synchronization with the rising timing of the clock signal TDCLK, and the light emitting unit 110 emits pulse light toward the object (first timing). The sequencer 21 outputs the clock signal TDCLK to the upper counter 26 as the clock signal CoarseCLK, and the upper counter 26 starts a counting operation. At the rising timing of the clock signal CoarseCLK, the data Dcoarse changes from "0" to "1".

At time t11, at the timing of rising of the clock signal CoarseCLK, the data Dcoarse of the upper counter 26 changes from "1" to "2".

At time t12, the pixel 10 detects the pulse light reflected by the object and outputs the signal STOP (second timing). The sequence signal ENS transitions from the low level to the high level, and the enable signal EN of the multiplexer 22 similarly transitions from the low level to the high level.

When the enable signal EN becomes the high level, the multiphase VCO 23 starts to oscillate.

At time t13, the clock signal CoarseCLK rises, and the data Dcoarse of the upper counter 26 changes from "3" to "4". In FIG. 5, the output node of the flip-flop 211 of the sequencer 21 changes from the low level to the high level. The output node of the flip-flop 212 maintains the low level, and the sequence signal ENS maintains the high level. Therefore, the enable signal EN from the multiplexer 22 also maintains the high level, and the multiphase VCO 23 continues to oscillate. Further, the sequencer 21 continues to output the clock signal TDCLK as the clock signal CoarseCLK.

At time t14, the clock signal TDCLK rises, and the output node of the flip-flop 212 of the sequencer 21 in FIG. 5 becomes the high level. The sequence signal ENS at the output node of the gate 214 transitions from the high level to the low level. That is, the sequencer 21 sets the sequence signal ENS to the low level from the rising timing of the signal STOP to the second rising timing of the clock signal. The low-level sequence signal ENS is supplied as the enable signal EN from the multiplexer 22 to the multiphase VCO 23, and the multiphase VCO 23 stops oscillation. Further, the sequencer 21 stops outputting the clock signal CoarseCLK, and the upper counter 26 stops the counting operation.

Thereafter, the TDC 20 outputs upper TDC data (Dcoarse) and lower TDC data (Dfine_cycle, Dfine_phase). The ranging image sensor 100 calculates the data and outputs the time digital data (measured distance information). The time digital data corresponding to the time from the signal START to the signal STOP is represented by the following bit string (expression):

$$D_{coarse} \times 2^{b2+b3} - (D_{fine\_cycle} \times 2^{b3} + D_{fine\_phase}) \quad \text{(Expression 1)}.$$

Here, "b2" represents the bit length (resolution) of the data Dfine_cycle, and "b3" represents the bit length (resolution) of the data Dfine_phase. For example, when the bit length b1 of the data Dcoarse is six bits of "101010", the bit length b2 of the data Dfine_cycle is five bits of "01010", and the bit length b3 of the data Dfine_phase is three bits of "010", the time digital data before correction is "10101001010010". In other words, six bits of the upper TDC data (upper bits) and eight bits of the lower TDC data (lower bit) are connected as the time digital data having a resolution of 14 bits (=b1+b2+b3). Here, if the upper TDC 20A and the lower TDC 20B operate asynchronously with each other, the ratio of the bit change with respect to the time change may not be linear in the linkage code between the lower TDC data and the upper TDC data, i.e., the carry from the eighth bit to the ninth bit, and a non-linear step may be caused. In the present embodiment, as will be described later, the PLL circuit 50 and the correction circuit 60 can reduce code errors in the connection of the upper TDC data and the lower TDC data.

The TDC 20 in this embodiment performs time-to-digital conversion in two stages of the upper TDC 20A and the lower TDC 20B. Since the lower TDC 20B operates at high speed, power consumption of the multiphase VCO 23 can be increased. However, in the present embodiment, the operation time of the lower TDC 20B is limited to a predetermined period from the light reception timing (t12). That is, the operation time (t12 to t14) of the lower TDC 20B is shorter than the conversion time (t10 to t12) from the light emission timing to the light reception timing. Therefore, it is possible to realize high-precision time-to-digital conversion using the lower TDC 20B while suppressing power consumption.

Figure 10:
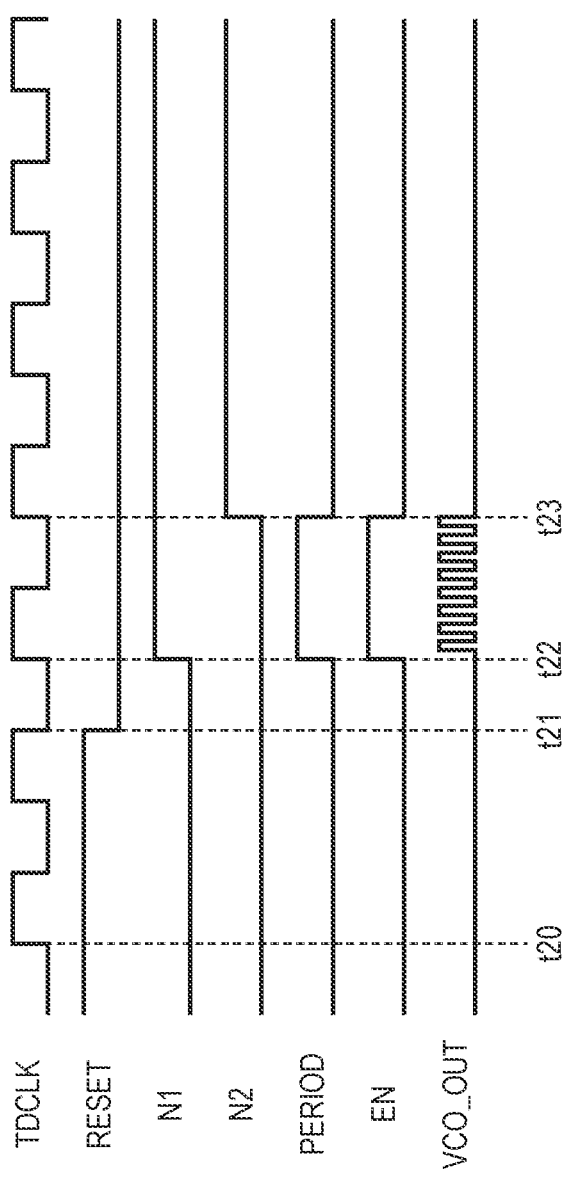
FIG. 10 is a timing chart of the ranging image sensor according to the first embodiment.

FIG. 10 is a timing chart of the ranging image sensor according to the present embodiment, and is illustrating the operation in the period measurement mode. In the period measurement mode, the lower TDC data (Dfine_cycle_tdclk, Dfine_phase_tdclk) in one cycle or a plurality of cycles of the clock signal TDCLK is measured. The correction circuit 60 can correct the time digital data of the Expression 1 based on the measured lower TDC data. In FIG. 10, although an actual circuit may include an operation delay, it is shown as having no operation delay. In the period measurement mode, the multiplexer 22 outputs the period signal PERIOD from the signal generation circuit 40 to the multiphase VCO 23 as the enable signal EN.

At time t20, the reset nodes of the flip-flops 41 and 42 of the signal generation circuit 40 of FIG. 7 are at a high level, and the flip-flops 41 and 42 are in a reset state. Therefore, the nodes N1 and N2, the signal PERIOD, and the enable signal EN are at a low level, and the multiphase VCO 23 stops oscillation.

At time t21, the reset nodes of the flip-flops 41 and 42 of the signal generation circuit 40 transition from the high level to the low level.

At time t22, when the clock signal TDCLK rises, the node N1 of the flip-flop 41 of the signal generation circuit 40 transitions from low level to high level, and the signal PERIOD of the output node of the gate 43 transitions from the low level to the high level. The multiplexer 22 of FIG. 4 outputs the signal PERIOD as the enable signal EN, and the enable signal EN similarly transitions from the low level to the high level. The multiphase VCO 23 receives the enable signal EN of the high level and starts oscillation. The lower encoder 24 and the lower counter 25 in the TDC 20 start counting based on the clock signal of the multiphase VCO 23.

At time t23, when the clock signal TDCLK rises, the node N2 of the flip-flop 42 of the signal generation circuit 40 transitions from the low level to the high level, and the signal PERIOD of the output node of the gate 43 transitions from the high level to the low level. The enable signal EN also becomes the low level, and the multiphase VCO 23 stops oscillation. The lower counter 25 outputs data Dfine_cycle_tdclk, and the lower encoder 24 outputs data Dfine_phase_tdclk. The data Dfine_cycle_tdclk and the data Dfine_phase_tdclk correspond to one cycle of the clock signal TDCLK.

The measured data Dfine_cycle_tdclk and Dfine_phase_tdclk are stored in a memory in the correction circuit 60, and are used for correction of distance information in the range image measurement mode. The data Dfine_cycle_tdclk and the data Dfine_phase_tdclk may be measured for each TDC 20 or may be measured for any one of the TDCs 20.

The correction circuit 60 can correct the time digital data measured in the range image measurement mode using the data Dfine_cycle_tdclk and the data Dfine_phase_tdclk measured in the period measurement mode. The correction circuit 60 may include a memory for storing a program for correction processing, and an arithmetic circuit for executing the program. Details of the period measurement mode and the correction process will be described below.

The correction circuit 60 performs correction (calibration) on the distance information (Expression 1) before correction in the range image measurement mode using the data Dfine_cycle_tdclk and the data Dfine_phase_tdclk in the period measurement mode. The time digital data after correction is calculated according to the following expression:

$$D_{coarse} \times 2^{b_2+b_3} - \frac{2^{b_2+b_3}\left(D_{fine\_cycle} \times 2^{b_3} + D_{fine\_phase}\right)}{D_{fine\_cycle\_tdclk} \times 2^{b_3} + D_{fine\_phase\_tdclk}} = \quad \text{(Expression 2)}$$

$$2^{b_2+b_3}\left(D_{coarse} - \frac{\left(D_{fine\_cycle} \times 2^{b_3} + D_{fine\_phase}\right)}{D_{fine\_cycle\_tdclk} \times 2^{b_3} + D_{fine\_phase\_tdclk}}\right).$$

In the Expression 2, "b2" represents the bit length (resolution) of the lower counter 25, and "b3" represents the bit length (resolution) of the lower encoder 24. In the Expression 2, (Dfine_cycle_tdclk×$2^{b_3}$+Dfine_phase_tdclk) represents the lower TDC data corresponding to one cycle of the clock signal TDCLK. The correction circuit 60 corrects the lower TDC data in the range image measurement mode with reference to the lower TDC data in one cycle of the clock signal TDCLK. This makes it possible to reduce code errors at the boundary between the upper TDC data and the lower TDC data and realize a high-precision TDC.

Here, as another configuration different from the present embodiment, it is conceivable to adjust the frequency of the clock signal TDCLK in order to reduce the code errors at the boundary between the upper TDC data and the lower TDC data. However, the clock signal TDCLK is often used commonly throughout the system, and the change of the frequency of the clock signal TDCLK may worsen the operation of the system. According to the present embodiment, it is possible to reduce code errors at the boundary between the upper TDC data and the lower TDC data without changing the clock signal TDCLK.

In the present embodiment, the frequency of the multiphase VCO 23 of the lower TDC 20B is controlled by the PLL circuit 50. That is, the frequency of the multiphase VCO 53 of the PLL circuit 50 is controlled by the control voltage VCTRL so as to be an integer multiple of the frequency of the clock signal TDCLK, and the control voltage VCTRL of the multiphase VCO 53 is also supplied to the multiphase VCO 23 of the lower TDC 20B. The multiphase VCO 53 of the PLL circuit 50 is configured as a replica circuit of the multiphase VCO 23 of the lower TDC 20B. Although the multiphase VCO 23 of the lower TDC 20B is not included in a feedback loop of the PLL circuit 50, the multiphase VCO 23 operates similarly to the multiphase VCO 53 of the PLL circuit 50, and the multiphase VCO 23 can oscillate at a frequency that is an integer multiple of the clock signal TDCLK. This makes it possible to reduce code errors at the boundary between the upper TDC data and the lower TDC data.

Further, the PLL circuit 50 can reduce the frequency variation of the multiphase VCO 23 of the lower TDC 20B and the oscillation frequency variation of the lower TDCs 20B. The delay time of the inverting circuits constituting the ring oscillator is likely to vary, and the oscillation frequencies of the respective multiphase VCOs 23 may vary. In order to reduce power consumption, the element size of the ring oscillator is preferably small, but in this case, a shift of the oscillation frequency of the ring oscillator may be larger. Further, the oscillation frequency of the ring oscillator may vary depending on various factors such as manufacturing process, drive voltage, temperature, etc. Therefore, the least significant bit LSB of the lower TDC data may vary. According to the present embodiment, the PLL circuit 50 is shared by a plurality of the multiphase VCOs 23, and the plurality of the multiphase VCOs 23 are controlled by the common PLL circuit 50. The PLL circuit 50 is operated by the multiphase VCO 53 which is a replica circuit of the multiphase VCO 23. Therefore, the frequency variation of the multiphase VCO 23 of the lower TDC 20B and the variation of the oscillation frequency of the plurality of lower TDCs 20B can be reduced.

Further, according to the present embodiment, the correction circuit 60 corrects the lower TDC data obtained in the range image measurement mode based on the lower TDC data obtained in the period measurement mode. This makes it possible to further reduce code errors at the boundary between the upper TDC data and the lower TDC data, and realize a high-precision TDC.

Second Embodiment

Next, a ranging image sensor system according to the present embodiment will be described. In the period measurement mode described above, the lower TDC data corresponding to one period of the clock signal TDCLK is measured, but the number of cycles is not limited. Hereinafter, the present embodiment will be described mainly with respect to a configuration different from that of the first embodiment.

Figure 11A:
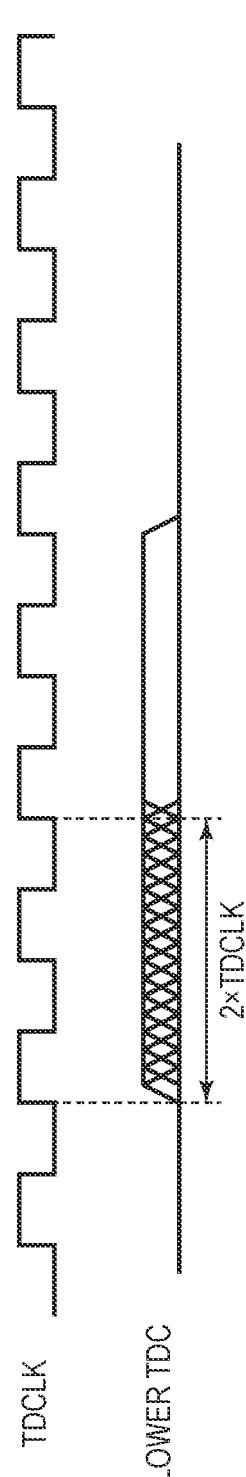
FIGS. 11A and 11B are timing charts of a ranging image sensor according to a second embodiment.
Figure 11B:
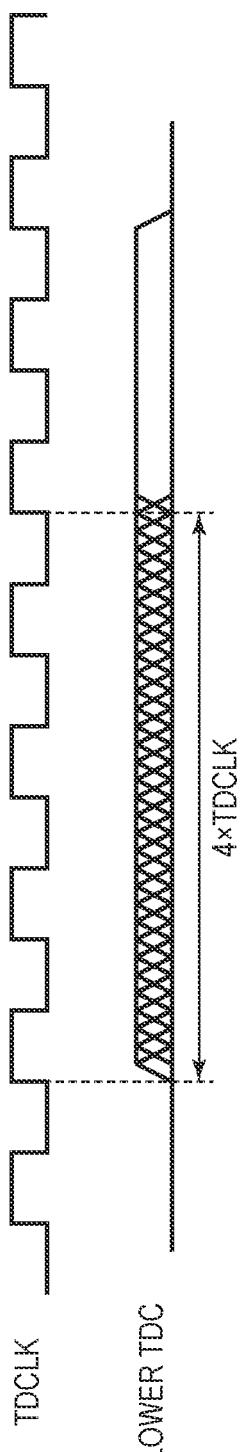

FIGS. 11A and 11B are timing charts of the ranging image sensor and illustrate the operation in the period measurement mode. As shown in FIG. 11A, the lower TDC data corresponding to two cycles of the clock signal TDCLK may be measured. Further, as shown in FIG. 11B, the lower TDC data corresponding to four cycles of the clock signal TDCLK may be measured. When the lower TDC data is measured in N cycles (N is an integer greater than or equal to 2) of the clock signal TDCLK, the data Dfine_cycle_tdclk and Dfine_phase_tdclk corresponding to one cycle of the clock signal TDCLK become 1/N times the data Dfine_cycle and Dfine_phase. That is, the correction circuit 60 can calculate the data Dfine_cycle_tdclk of the lower counter and the data Dfine_phase_tdclk of the lower encoder by dividing the data Dfine_cycle of the lower counter and the data Dfine_phase of the lower encoder in the N cycles of the clock signal TDCLK by N. In this way, the correction circuit 60 can correct the time data in the range image measurement mode using the lower TDC data of a plurality of cycles of the clock signal TDCLK.

Also in the present embodiment, it is possible to obtain the same operation and effect as those of the above-described embodiment. That is, it is possible to further reduce the code error at the boundary between the upper TDC data and the lower TDC data. Further, since the oscillation frequency may not be stable immediately after the multiphase VCO 23 starts oscillation, it is possible to realize a high-precision TDC by increasing the number of cycles in the cycle measurement mode.

Third Embodiment

Next, a ranging image sensor system according to the present embodiment will be described. The delay element of the lower TDC 20B is not limited to the multiphase VCO 23, and may be replaced with another configuration. Hereinafter, the present embodiment will be described mainly with respect to points different from the above-described embodiment.

Figure 12:
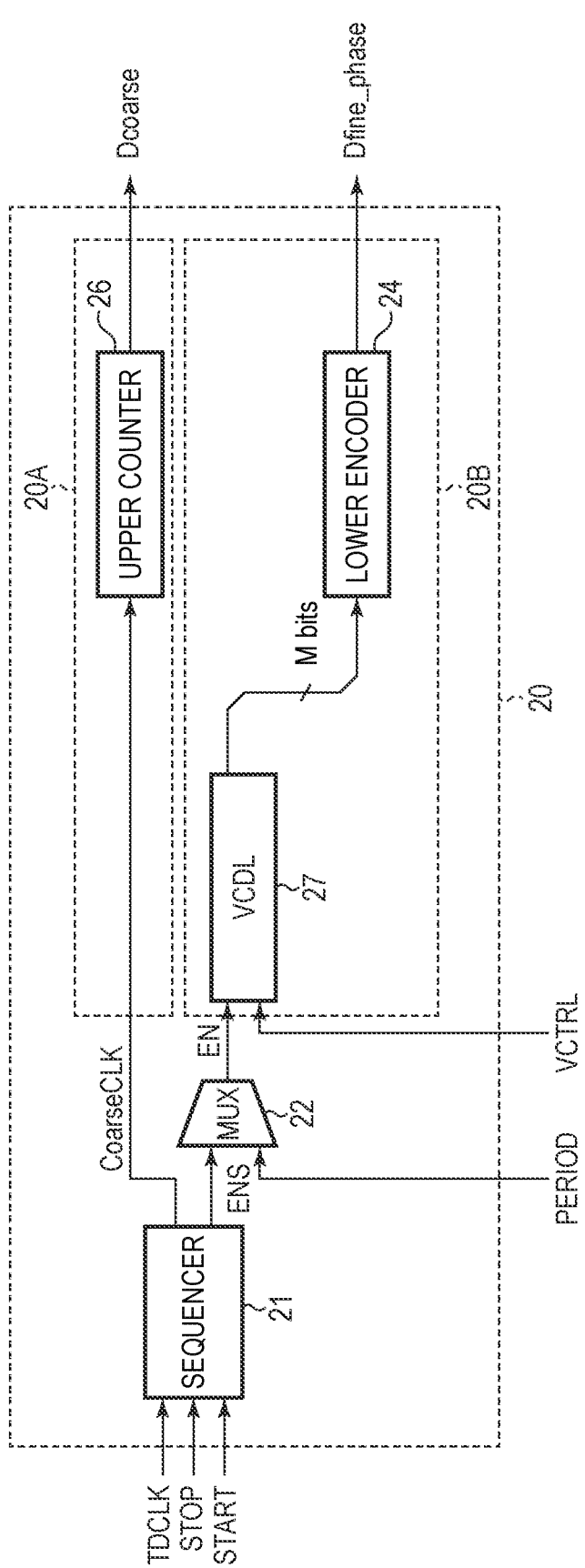
FIG. 12 is a circuit diagram of a time-to-digital conversion device according to a third embodiment.

FIG. 12 is a circuit diagram of the TDC 20 in the present embodiment. The TDC 20 in the present embodiment includes a voltage-controlled delay line (VCDL) 27 instead of the multiphase VCO 23. The voltage-controlled delay line 27 includes a plurality of delay elements connected in series, and constitutes a multiphase output VCDL. Each delay element includes, for example, an inverting circuit such as a differential amplifier circuit and a load circuit of the inverting circuit. The control voltage VCTRL is applied to a transistor gate or the like constituting the load circuit, and the delay time is controlled by the control voltage VCTRL. Similarly to the first embodiment, the voltage-controlled delay line 27 can start operation in response to the enable signal EN of high level. The lower encoder 24 encodes data of the output phase of the voltage-controlled delay line 27, and outputs the data Dfine_phase of binary code. The voltage-controlled delay line 27 does not have a ring oscillator configuration like the multiphase VCO 23. Therefore, the lower counter 25 is not provided in the TDC 20 in the present embodiment, and the data Dfine_phase is output as the lower TDC data Dfine.

Figure 13:
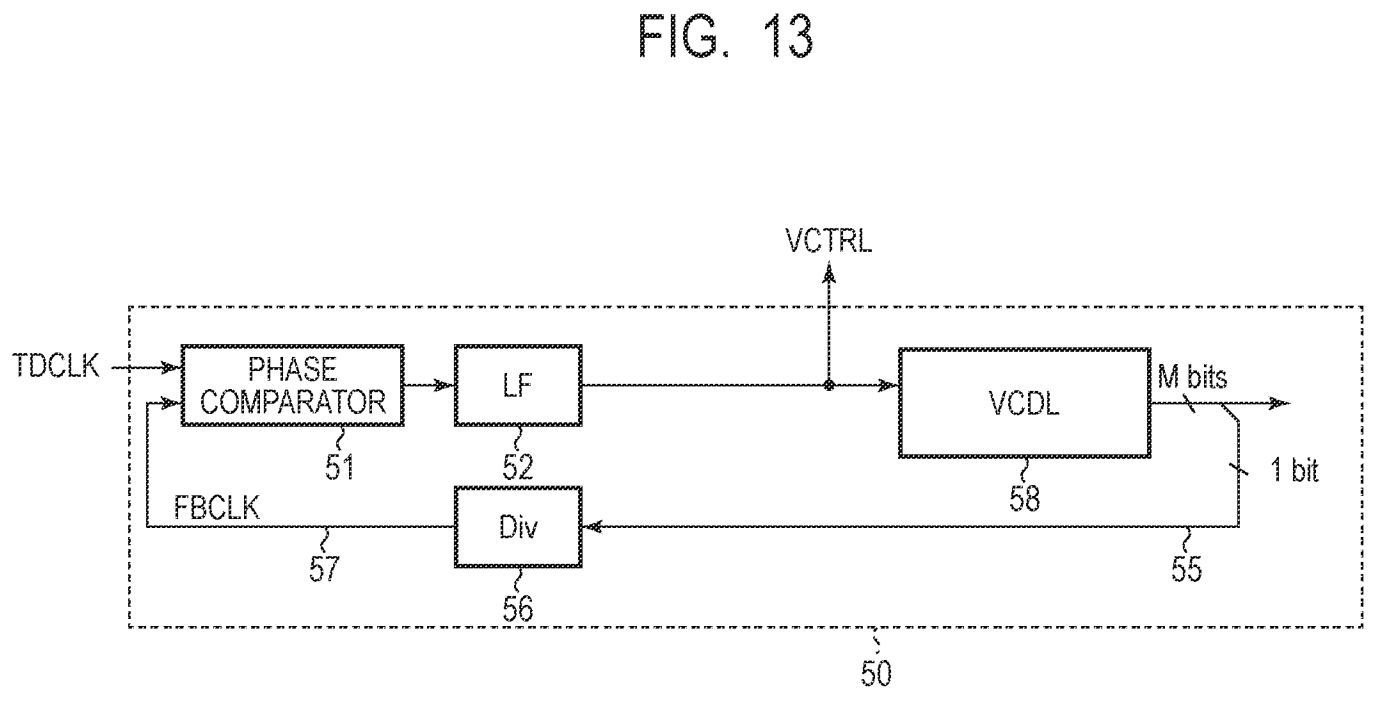

FIG. 13 is a circuit diagram of the PLL circuit 50 in the present embodiment. In the PLL circuit 50 of the present embodiment, a voltage-controlled delay line 58 is provided instead of the multiphase VCO 53. The PLL circuit 50 using the voltage-controlled delay line 58 may be referred to as a DLL (Delay Locked Loop). The voltage-controlled delay line 58 of the PLL circuit 50 desirably has the same characteristics as the voltage-controlled delay line 27 of the TDC 20, and the voltage-controlled delay line 58 may be configured as a replica circuit having the same circuit and size as the voltage-controlled delay line 27 on the semiconductor substrate. The phase (delay time) of the voltage-controlled delay line 58 is controlled so that the clock signal TDCLK and the feedback clock signal FBCLK have the same phase. The control voltage VCTRL is similarly supplied to the voltage-controlled delay lines 27 of the TDCs 20. Thereby, the phase of the voltage-controlled delay line 27 is synchronized with the phase of a signal having a frequency that is an integer multiple of the clock signal TDCLK. Further, since the frequency and phase of the voltage-controlled delay line 27 of each TDC 20 are controlled by the common PLL circuit 50, the frequency and phase of the voltage-controlled delay line 27 of each TDC 20 are robust against variations in manufacturing process, voltage, and temperature. Therefore, even if each element size of the voltage-controlled delay lines 27 and 58 is small, variations in characteristics are reduced, and power consumption can be reduced.

Also in the present embodiment, the ranging image sensor 100 can calculate the data output from the TDC 20 to output as the time digital data (measured distance information). When the upper TDC data is represented by the data Dcoarse of the bit length b1 and the lower TDC data is represented by the data Dfine of the bit length b2, the time digital data has a bit length (b1+b2), and the Expression 1 described above can be rewritten as:

$$D\text{coarse} \times 2^{b2} - D\text{fine} \qquad \text{(Expression 3).}$$

Here, the lower TDC data Dfine is represented by generalizing (Dfine_phase) in the present embodiment or (Dfine_clock × 2^{b3} + Dfine_phase) in the first embodiment.

Further, the correction circuit 60 can correct the time digital data using the data Dfine_tdclk of the lower TDC 20B in the period of one cycle of the clock signal TDCLK. The Expression 2 described above can be simplified to the following expression:

$$D\text{coarse} \times 2^{b2} - (D\text{fine}/D\text{fine\_tdclk}) \times 2^{b2} \qquad \text{(Expression 4).}$$

Also in the present embodiment, it is possible to further reduce the code error at the boundary between the upper TDC data and the lower TDC data and realize the high-precision time-to-digital conversion.

Fourth Embodiment

Figure 14:
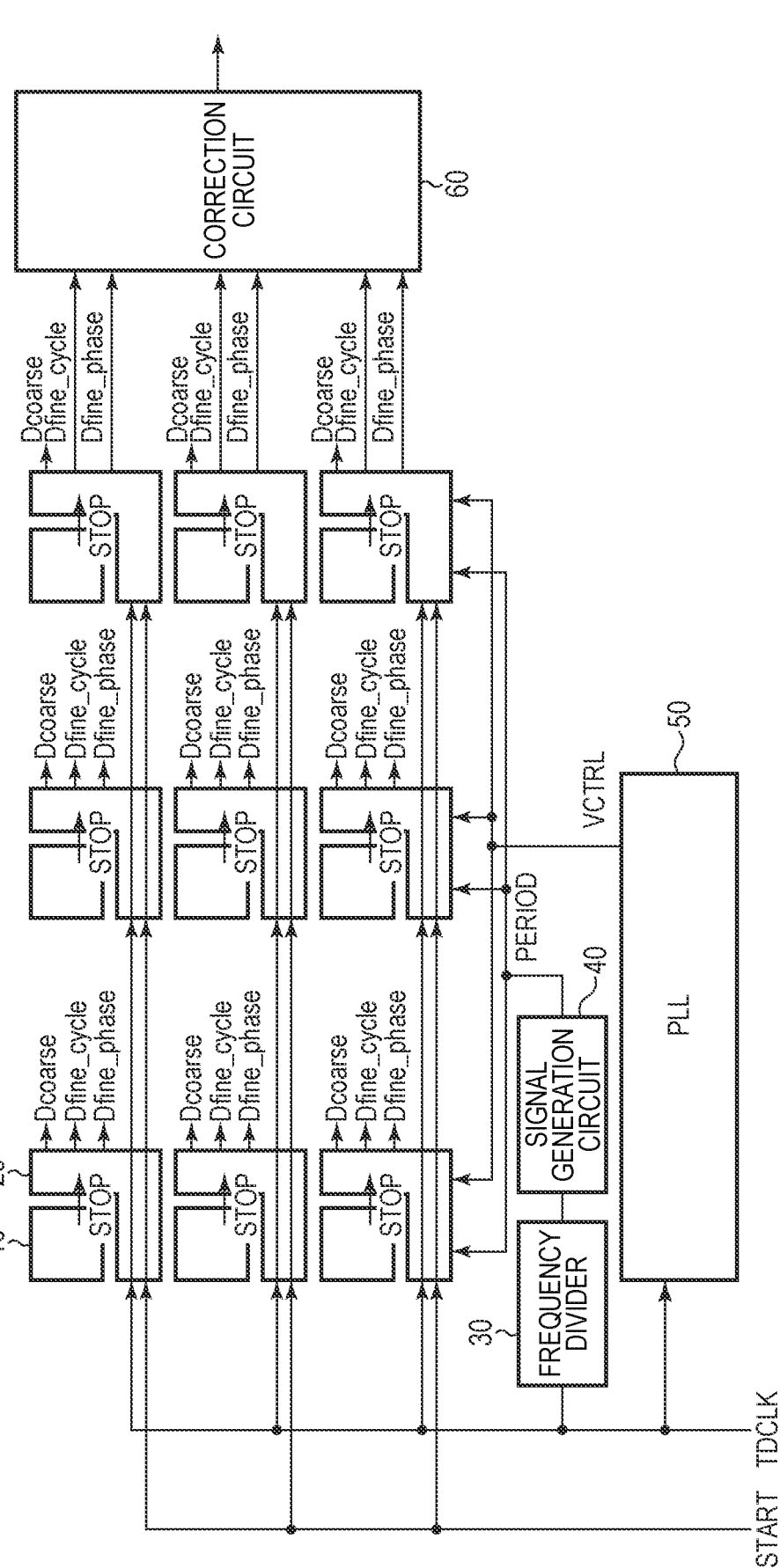
FIG. 14 is a block diagram of an optical time-of-flight ranging image sensor according to a fourth embodiment.

FIG. 14 is a block diagram of the ranging image sensor 100 according to the present embodiment. Hereinafter, the present embodiment will be described mainly by focusing on a configuration different from the first to third embodiments.

Although the TDC 20 is provided for each row of the pixels 10 in the above embodiments, the TDC 20 is provided for each pixel 10 (each light receiving unit) in the present embodiment. In each pixel 10, the signal STOP is output to the TDC 20 and the time-to-digital conversion can be performed by the TDC 20 for each pixel 10. Also in the present embodiment, since the plurality of TDCs 20 are controlled by the common PLL circuit 50, it is possible to reduce variation and change of oscillation frequencies in the TDCs 20. Further, the data Dfine_cycle and the data Dfine_phase of each TDC 20 are output to the correction circuit 60, and the correction circuit 60 corrects the lower TDC data. Therefore, also in the present embodiment, it is possible to reduce code errors at the boundary between the upper TDC data and the lower TDC data, and realize high-precision time-to-digital conversion.

Fifth Embodiment

Figure 15:
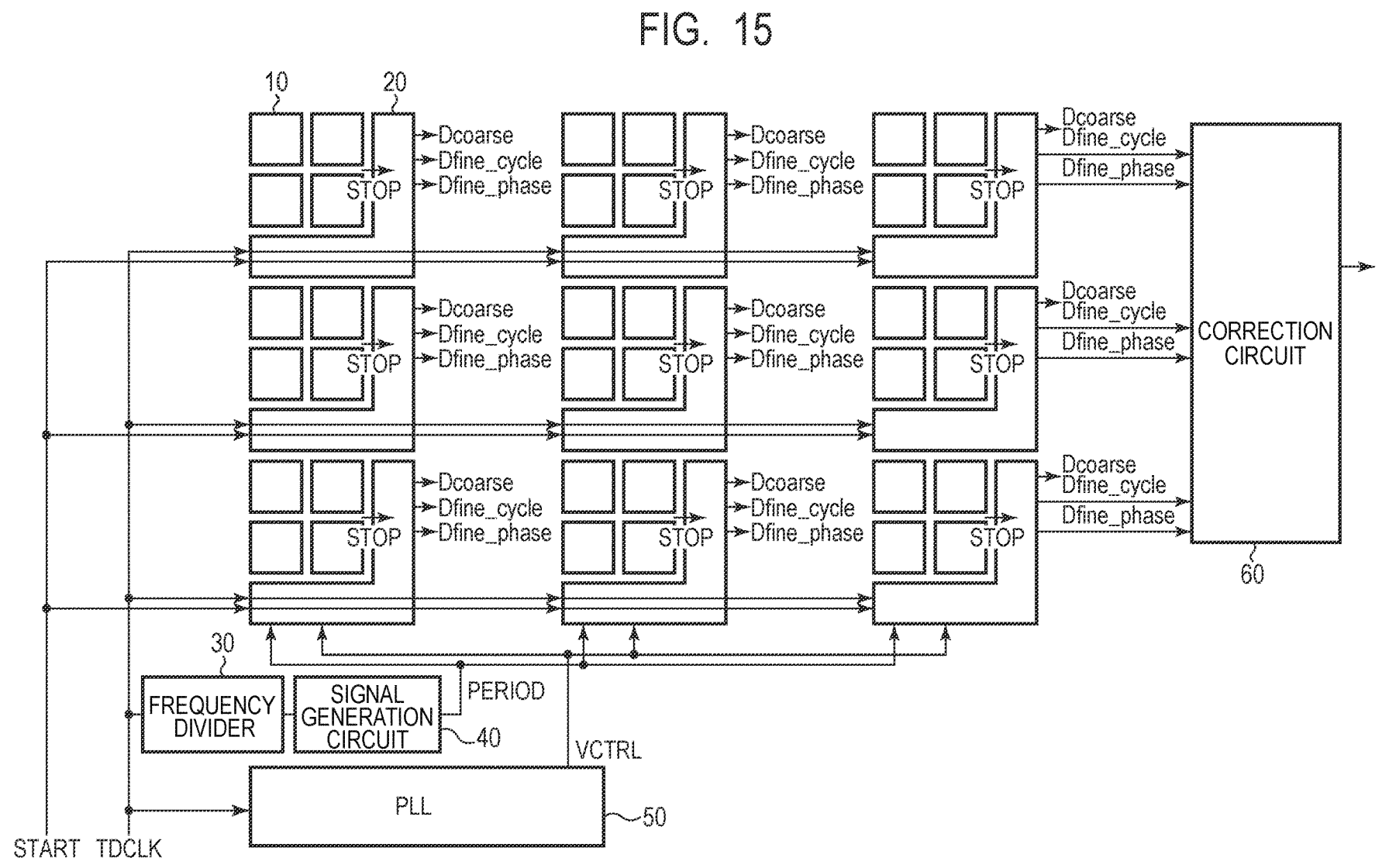

FIG. 15 is a block diagram of the ranging image sensor 100 according to the present embodiment. Hereinafter, the present embodiment will be described mainly by focusing on a configuration different from the first to fourth embodiments.

The TDC 20 is provided for each sub-array including a plurality of pixels 10. In FIG. 15, the sub-array includes two rows and two columns of pixels 10, and the TDC 20 is provided for every four pixels 10. Also in the present embodiment, since all the TDCs 20 are controlled by the common PLL circuit 50, it is possible to reduce variation and change in oscillation frequencies in the TDCs 20. Further, since the correction of the lower TDC data is performed in the correction circuit 60, it is possible to reduce code errors at the boundary between the upper TDC data and the lower TDC data and realize a high-precision TDC.

Sixth Embodiment

Figure 16:
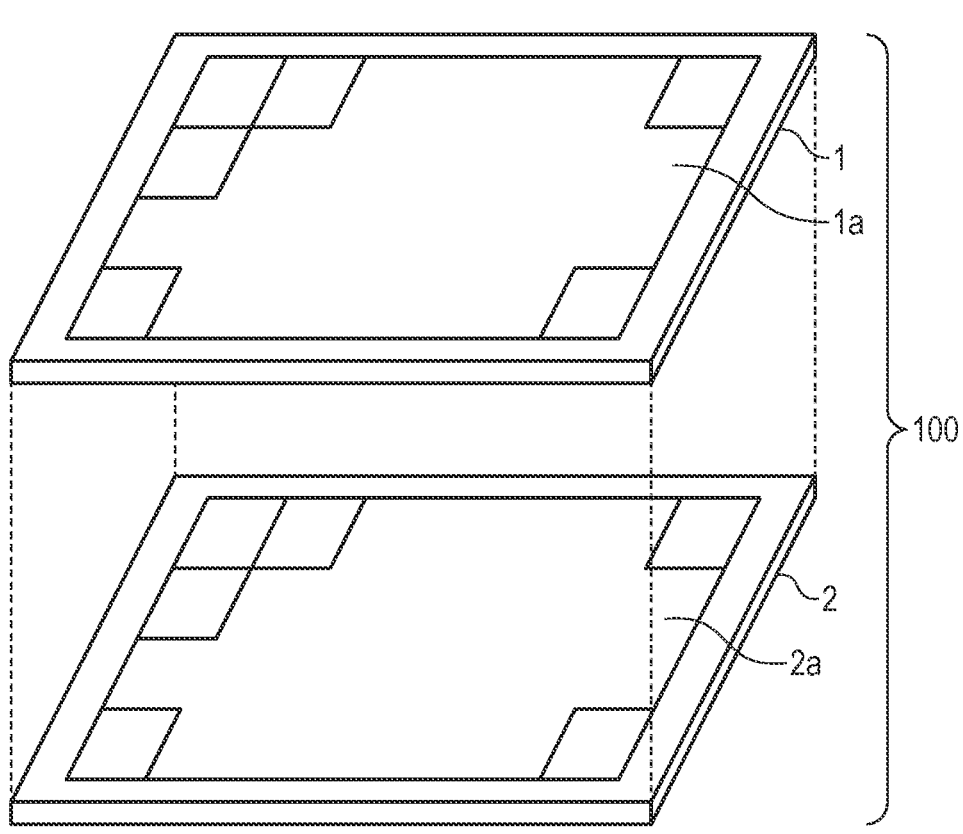
FIG. 16 is a schematic diagram of a time-to-digital conversion device according to a sixth embodiment.

FIG. 16 is a schematic diagram of the ranging image sensor 100 according to the present embodiment, and illustrates a configuration of the stacked ranging image sensor 100. The ranging image sensor 100 includes a sensor substrate (first substrate) 1 and a circuit substrate (second substrate) 2 stacked on each other, and the sensor substrate 1 and the circuit substrate 2 are electrically connected to each other. The ranging image sensor 100 is a back-illumination type, and light is incident from a first surface of the sensor substrate 1, and a circuit substrate 2 is disposed on a second surface of the sensor substrate 1. The sensor substrate 1 includes a first semiconductor layer and a first wiring structure. The circuit substrate 2 includes a second semiconductor layer and a second wiring structure. The ranging image sensor 100 is formed by stacking the second semiconductor layer, the second wiring structure, the first wiring structure, and the first semiconductor layer in this order.

The sensor substrate 1 and the circuit substrate 2 may be diced chips, but are not limited to chips. For example, each substrate may be a wafer. Further, each substrate may be diced after being stacked in a wafer state, or each chip may be stacked and bonded after being diced into chips. The sensor substrate 1 is provided with a pixel region 1a including an array of pixels 10, and the circuit substrate 2 is provided with a circuit region 2a for processing signals detected by the pixel region 1a. In the circuit region 2a, the TDC 20, the frequency divider 30, the signal generation circuit 40, the PLL circuit 50, the correction circuit 60, and the like may be formed.

Also in the present embodiment, it is possible to obtain the same operation and effect as those of the above-described embodiments. By stacking the sensor substrate 1 and the circuit substrate 2, it is possible to realize the ranging image sensor 100 having high sensitivity and high integration. Instead, the ranging image sensor 100 may be formed on the same substrate.

Seventh Embodiment

Figure 17A:
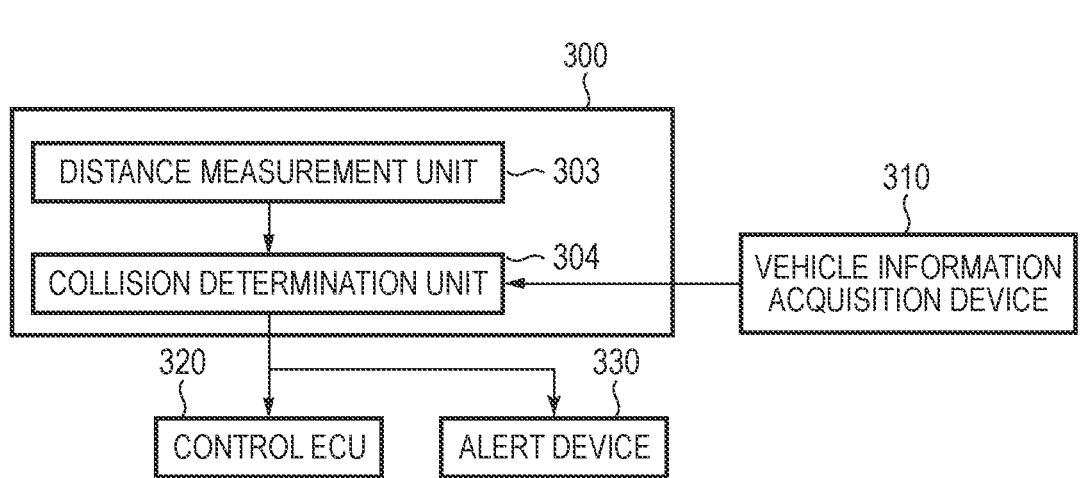
FIGS. 17A and 17B are diagrams illustrating a configuration example of equipment according to a seventh embodiment.
Figure 17B:
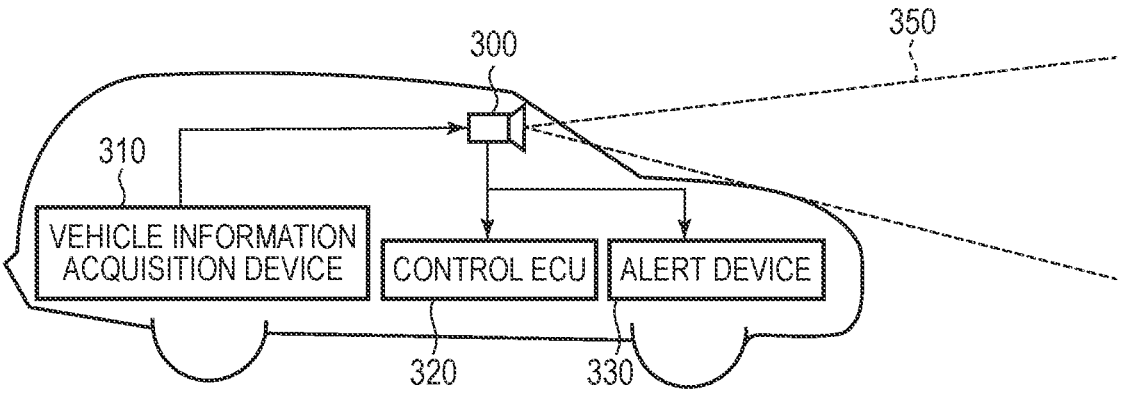

A movable body according to a seventh embodiment of the present invention will be described with reference to FIGS. 17A and 17B. FIGS. 17A and 17B are diagrams illustrating a configuration example of a movable body according to the present embodiment.

FIG. 17A illustrate a configuration example of equipment mounted on a vehicle as an in-vehicle camera. The equipment 300 includes a distance measurement unit 303 and a collision determination unit 304. The distance measurement unit 303 includes the ranging image sensor 100 according to any of the first to sixth embodiments, and measures a distance to an object. The distance information is information on a distance to the object or the like. The collision determination unit 304 determines whether or not there is a possibility of collision based on the distance measured by the distance measurement unit 303.

The equipment 300 is connected to the vehicle information acquisition device 310, and can obtain vehicle information such as a vehicle speed, a yaw rate, and a steering angle. Further, the equipment 300 is connected to a control ECU 320 which is a control device for outputting a control signal for generating a braking force to the vehicle based on the determination result of the collision determination unit 304. The equipment 300 is also connected to an alert device 330 that issues an alert to the driver based on the determination result of the collision determination unit 304. For example, when the collision possibility is high as the determination result of the collision determination unit 304, the control ECU 320 instructs the vehicle to perform a brake operation, an accelerator stop, an engine output suppression, and the like, thereby avoiding the collision and reducing damage. The alert device 330 alerts the user by sounding an alert such as a sound, displaying alert information on a screen of a car navigation system or the like, or giving vibration to a seat belt or a steering wheel. These devices of the equipment 300 function as a movable body control unit that controls the operation of controlling the vehicle as described above.

In the present embodiment, the equipment 300 measures the distance around the vehicle, for example, the front or the rear. FIG. 17B illustrates the equipment when distance measurement is performed in front of the vehicle (distance measurement area 350). The vehicle information acquisition device 310 as the distance measurement control means sends an instruction to the equipment 300 or the distance measurement unit 303 to perform the distance measurement operation. With such a configuration, the accuracy of distance measurement can be further improved.

Although the control of collision avoidance with other vehicles has been described above, the present embodiment is also applicable to control of automatic driving following other vehicles, control of automatic driving so as not to go beyond a lane, and the like. Further, the equipment is not limited to a vehicle such as an automobile, and can be applied to a movable body (moving device) such as a ship, an aircraft, an artificial satellite, an industrial robot, or a consumer robot. In addition, the present invention can be applied not only to a movable body but also to a wide variety of equipment using object recognition or biological recognition, such as an intelligent transport system (ITS) and a surveillance system.

Other Modified Embodiments

The present invention is not limited to the above embodiments, and various modifications are possible. For example, an example in which some of the configurations of any of the embodiments are added to other embodiments and an example in which some of the configurations of other embodiments are substituted are also embodiments of the present invention.

The present invention can also be implemented by a process in which a program for implementing one or more functions of the above-described embodiments is supplied to a system or apparatus via a network or a storage medium, and one or more processors in a computer of the system or apparatus read and execute the program. The present invention can also be implemented by a circuit (e.g., ASIC) that realizes one or more functions.

It should be noted that any of the embodiments described above is merely an example of an embodiment for carrying out the present invention, and the technical scope of the present invention should not be construed as being limited by the embodiments. That is, the present invention can be implemented in various forms without departing from the technical idea or the main features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present disclosure includes the following configurations.

Configuration 1

A time-to-digital conversion device configured to output time digital data according to a time from a first timing to a second timing, comprising:

a first circuit that includes an upper counter configured to start counting a clock signal according to the first timing, and generates upper bits of the time digital data;

a second circuit that includes a delay element configured to start operation according to the second timing and a lower counter configured to count an oscillation cycle of the delay element, and generates lower bits of the time digital data; and a control circuit that controls a phase of an output signal of the delay element based on the clock signal.

Configuration 2

The time-to-digital conversion device according to Configuration 1, wherein the control circuit includes:
  a replica circuit of the delay element of the second circuit; and
  a phase synchronization circuit that feeds back to the replica circuit a control voltage based on a comparison between a phase of a divided signal of an output signal of the replica circuit and a phase of the clock signal,
  wherein the control circuit further supplies the control voltage to the delay element of the second circuit.

Configuration 3

The time-to-digital conversion device according to Configuration 1 or 2, further comprising a plurality of the first circuits and a plurality of the second circuits,
  wherein the control circuit supplies the control voltage to the plurality of delay elements of the plurality of second circuits.

Configuration 4

The time-to-digital conversion device according to any one of Configurations 1 to 3, wherein the upper counter and the delay element stop operating after a predetermined period has elapsed from the second timing.

Configuration 5

The time-to-digital conversion device according to Configuration 4, wherein the predetermined period is a timing synchronized with the clock signal.

Configuration 6

The time-to-digital conversion device according to any one of Configurations 1 to 5, wherein the delay element is a voltage-controlled oscillator.

Configuration 7

The time-to-digital conversion device according to any one of Configurations 1 to 5, wherein the delay element is a multiphase output voltage-controlled oscillator.

Configuration 8

The time-to-digital conversion device according to any one of Configurations 1 to 5, wherein the delay element is a voltage-controlled delay line.

Configuration 9

The time-to-digital conversion device according to Configuration 7, wherein the second circuit further comprises a lower encoder configured to encode a multiphase output of the delay element.

Configuration 10

The time-to-digital conversion device according to Configuration 9, wherein the time digital data has a bit length (b1+b2+b3) and is represented by:

$$D_{coarse} \times 2^{b2+b3} - (D_{fine\_cycle} \times 2^{b3} + D_{fine\_phase}) \qquad \text{(Expression 1),}$$

where the upper bits are represented by data Dcoarse of bit length b1, data of the lower counter is represented by data Dfine_cycle of bit length b2, and data of the lower encoder is represented by data Dfine_phase of bit length b3.

Configuration 11

The time-to-digital conversion device according to Configuration 10, further comprising a correction circuit configured to correct the time digital data,
  wherein the correction circuit corrects the time digital data with data Dfine_cycle_tdclk of the lower counter and data Dfine_phase_tdclk of the lower encoder in a period of one cycle of the clock signal in accordance with the following expression:

$$D_{coarse} \times 2^{b2+b3} - \frac{2^{b2+b3}\left(D_{fine\_cycle} \times 2^{b3} + D_{fine\_phase}\right)}{D_{fine\_cycle\_tdclk} \times 2^{b3} + D_{fine\_phase\_tdclk}} = \qquad \text{(Expression 2)}$$

$$2^{b2+b3}\left(D_{coarse} - \frac{\left(D_{fine\_cycle} \times 2^{b3} + D_{fine\_phase}\right)}{D_{fine\_cycle\_tdclk} \times 2^{b3} + D_{fine\_phase\_tdclk}}\right).$$

Configuration 12

The time-to-digital conversion device according to Configuration 11, wherein the correction circuit calculates the data Dfine_cycle_tdclk of the lower counter and the data Dfine_phase_tdclk of the lower encoder by dividing the data Dfine_cycle of the lower counter and the data Dfine_phase of the lower encoder in N cycles (N is a positive integer) of the clock signal by N.

Configuration 13

The time-to-digital conversion device according to Configuration 11, further comprising a switching circuit configured to switch an operation mode of the second circuit,
  wherein the switching circuit causes:
  in a first operation mode, the delay element to be operated until a predetermined period of time has elapsed from the second timing; and
  in a second operation mode, the delay element to be operated during N cycles (N is a positive integer) of the clock signal.

Configuration 14

The time-to-digital conversion device according to any one of Configurations 1 to 9, wherein the time digital data has a bit length (b1+b2) and is represented by:

$$D_{coarse} \times 2^{b2} - D_{fine} \qquad \text{(Expression 3),}$$

where the upper bits are represented by data Dcoarse of a bit length b1 and the lower bits are represented by data Dfine of a bit length b2.

Configuration 15

The time-to-digital conversion device according to Configuration 14, further comprising a correction circuit configured to correct the time digital data, wherein the correction circuit corrects the time digital data with the data Dfine_tdclk of the lower bits in a period of one cycle of the clock signal in accordance with the following expression:

$$D_{coarse} \times 2^{b2} - (D_{fine}/D_{fine\_tdclk}) \times 2^{b2} \qquad \text{(Expression 4).}$$

Configuration 16

A ranging device comprising:
the time-to-digital conversion device according to any one of Configurations 1 to 15, and
a light receiving unit that receives pulse light emitted toward an object and reflected by the object,
wherein the time-to-digital conversion device acquires distance information to the object based on the time digital data corresponding to a time from the first timing to the second timing using an emission timing of the pulse light as the first timing and a reception timing of the pulse light as the second timing.

Configuration 17

The ranging device according to Configuration 16,
wherein a plurality of the light receiving units are arranged in a plurality of rows and a plurality of columns,
wherein the first circuit and the second circuit are provided for each row, and
wherein the control circuit is shared by a plurality of the second circuits.

Configuration 18

The ranging device according to Configuration 16,
wherein a plurality of the light receiving units are arranged in a plurality of rows and a plurality of columns,
wherein the first circuit and the second circuit are provided for each of the light receiving units, and
wherein the control circuit is shared by a plurality of the second circuits.

Configuration 19

The ranging device according to Configuration 16,
wherein a plurality of the light receiving units are arranged in a plurality of rows and a plurality of columns,
wherein the first circuit and the second circuit are provided for each sub-array including the plurality of light receiving units, and
wherein the control circuit is shared by a plurality of the second circuits.

Configuration 20

A movable body comprising:
the ranging device according to any one of Configurations 16 to 19, and
a control unit configured to control the movable body based on the distance information acquired by the ranging device.

This application claims the benefit of Japanese Patent Application No. 2022-125675, filed Aug. 5, 2022, which is hereby incorporated by reference herein in its entirety.

What is claimed is:

1. A time-to-digital conversion device configured to output time digital data according to a time from a first timing to a second timing, comprising:
a first circuit that includes an upper counter configured to start counting a clock signal according to the first timing, and generates upper bits of the time digital data;

a second circuit that includes a delay element configured to start operation according to the second timing and a lower counter configured to count an oscillation cycle of the delay element, and generates lower bits of the time digital data; and
a control circuit that controls a phase of an output signal of the delay element based on the clock signal,
wherein the delay element is a voltage-controlled oscillator.

2. The time-to-digital conversion device according to claim 1, wherein the upper counter and the delay element stop operating after a predetermined period has elapsed from the second timing.

3. The time-to-digital conversion device according to claim 2, wherein the predetermined period is a timing synchronized with the clock signal.

4. The time-to-digital conversion device according to claim 1, wherein the delay element is a multiphase output voltage-controlled oscillator.

5. The time-to-digital conversion device according to claim 4, wherein the second circuit further comprises a lower encoder configured to encode a multiphase output of the delay element.

6. The time-to-digital conversion device according to claim 5, wherein the time digital data has a bit length (b1+b2+b3) and is represented by:

$$D_{coarse} \times 2^{b2+b3} - (D_{fine\_cycle} = 2^{b3} + D_{fine\_phase}) \qquad \text{(Expression 1)},$$

where the upper bits are represented by data Dcoarse of bit length b1, data of the lower counter is represented by data Dfine_cycle of bit length b2, and data of the lower encoder is represented by data Dfine_phase of bit length b3.

7. The time-to-digital conversion device according to claim 6, further comprising a correction circuit configured to correct the time digital data,
wherein the correction circuit corrects the time digital data with data Dfine_cycle_tdclk of the lower counter and data Dfine_phase_tdclk of the lower encoder in a period of one cycle of the clock signal in accordance with the following expression:

$$D_{coarse} \times 2^{b2+b3} - \frac{2^{b2+b3}\left(D_{fine\_cycle} \times 2^{b3} + D_{fine\_phase}\right)}{D_{fine\_cycle\_tdclk} \times 2^{b3} + D_{fine\_phase\_tdclk}} = \qquad \text{(Expression 2)}$$

$$2^{b2+b3}\left(D_{coarse} - \frac{\left(D_{fine\_cycle} \times 2^{b3} + D_{fine\_phase}\right)}{D_{fine\_cycle\_tdclk} \times 2^{b3} + D_{fine\_phase\_tdclk}}\right).$$

8. The time-to-digital conversion device according to claim 7, wherein the correction circuit calculates the data Dfine_cycle_tdclk of the lower counter and the data Dfine_phase_tdclk of the lower encoder by dividing the data Dfine_cycle of the lower counter and the data Dfine_phase of the lower encoder in N cycles (N is a positive integer) of the clock signal by N.

9. The time-to-digital conversion device according to claim 7, further comprising a switching circuit configured to switch an operation mode of the second circuit,
wherein the switching circuit causes:
in a first operation mode, the delay element to be operated until a predetermined period of time has elapsed from the second timing; and
in a second operation mode, the delay element to be operated during N cycles (N is a positive integer) of the clock signal.

10. The time-to-digital conversion device according to claim 1, wherein the delay element is a voltage-controlled delay line.

11. The time-to-digital conversion device according to claim 1, wherein the time digital data has a bit length (b1+b2) and is represented by:

$$D\text{coarse} \times 2^{b2} - D\text{fine} \qquad \text{(Expression 3),}$$

where the upper bits are represented by data Dcoarse of a bit length b1 and the lower bits are represented by data Dfine of a bit length b2.

12. The time-to-digital conversion device according to claim 11, further comprising a correction circuit configured to correct the time digital data, wherein the correction circuit corrects the time digital data with the data Dfine_tdclk of the lower bits in a period of one cycle of the clock signal in accordance with the following expression:

$$D\text{coarse} \times 2^{b2} - (D\text{fine}/D\text{fine\_tdclk}) \times 2^{b2} \qquad \text{(Expression 4).}$$

13. A time-to-digital conversion device, configured to output time digital data according to a time from a first timing to a second timing, comprising:

a first circuit that includes an upper counter configured to start counting a clock signal according to the first timing, and generates upper bits of the time digital data;

a second circuit that includes a delay element configured to start operation according to the second timing and a lower counter configured to count an oscillation cycle of the delay element, and generates lower bits of the time digital data;

a control circuit that controls a phase of an output signal of the delay element based on the clock signal, wherein the control circuit includes:

a replica circuit of the delay element of the second circuit; and a phase synchronization circuit that feeds back to the replica circuit a control voltage based on a comparison between a phase of a divided signal of an output signal of the replica circuit and a phase of the clock signal and, wherein the control circuit further supplies the control voltage to the delay element of the second circuit.

14. The time-to-digital conversion device according to claim 13, further comprising a plurality of the first circuits and a plurality of the second circuits, wherein the control circuit supplies the control voltage to the plurality of delay elements of the plurality of second circuits.

15. A ranging device comprising:

a time-to-digital conversion device configured to output time digital data according to a time from a first timing to a second timing, the time-to-digital conversion device comprising:

a first circuit that includes an upper counter configured to start counting a clock signal according to the first timing, and generates upper bits of the time digital data;

a second circuit that includes a delay element configured to start operation according to the second timing and a lower counter configured to count an oscillation cycle of the delay element, and generates lower bits of the time digital data; and a control circuit that controls a phase of an output signal of the delay element based on the clock signal; and a light receiving unit that receives pulse light emitted toward an object and reflected by the object, wherein the time-to-digital conversion device acquires distance information to the object based on the time digital data corresponding to a time from the first timing to the second timing using an emission timing of the pulse light as the first timing and a reception timing of the pulse light as the second timing.

16. The ranging device according to claim 15, wherein a plurality of the light receiving units are arranged in a plurality of rows and a plurality of columns, wherein the first circuit and the second circuit are provided for each row, and wherein the control circuit is shared by a plurality of the second circuits.

17. The ranging device according to claim 15, wherein a plurality of the light receiving units are arranged in a plurality of rows and a plurality of columns, wherein the first circuit and the second circuit are provided for each of the light receiving units, and wherein the control circuit is shared by a plurality of the second circuits.

18. The ranging device according to claim 15, wherein a plurality of the light receiving units are arranged in a plurality of rows and a plurality of columns, wherein the first circuit and the second circuit are provided for each sub-array including the plurality of light receiving units, and wherein the control circuit is shared by a plurality of the second circuits.

19. A movable body comprising:

the ranging device according to claim 15, and a control unit configured to control the movable body based on the distance information acquired by the ranging device.

*   *   *   *   *